(12) United States Patent
Hayenga et al.

(10) Patent No.: US 10,185,731 B2
(45) Date of Patent: Jan. 22, 2019

(54) INDEXING ENTRIES OF A STORAGE STRUCTURE SHARED BETWEEN MULTIPLE THREADS

(71) Applicant: ARM LIMITED, Cambridge (GB)

(72) Inventors: Mitchell Bryan Hayenga, Austin, TX (US); Curtis Glenn Dunham, Austin, TX (US); Dam Sunwoo, Austin, TX (US)

(73) Assignee: ARM Limited, Cambridge (GB)

( * ) Notice: Subject to any disclaimer, the term of this patent is extended or adjusted under 35 U.S.C. 154(b) by 357 days.

(21) Appl. No.: 15/086,866

(22) Filed: Mar. 31, 2016

(65) Prior Publication Data
US 2017/0286421 A1 Oct. 5, 2017

(51) Int. Cl.
*G06F 17/30* (2006.01)
*G06F 12/0875* (2016.01)

(52) U.S. Cl.
CPC ...... *G06F 17/3033* (2013.01); *G06F 12/0875* (2013.01); *G06F 17/30132* (2013.01); *G06F 2212/6032* (2013.04)

(58) Field of Classification Search
CPC .......... G06F 17/3033; G06F 17/30132; G06F 12/0875; G06F 2212/6032
See application file for complete search history.

(56) References Cited

U.S. PATENT DOCUMENTS

| 5,577,231 | A | * | 11/1996 | Scalzi | G06F 9/45537 703/26 |
| 5,752,275 | A | * | 5/1998 | Hammond | G06F 12/1027 711/128 |
| 6,633,963 | B1 | * | 10/2003 | Ellison | G06F 12/1441 711/152 |
| 9,690,714 | B1 | * | 6/2017 | Sites | G06F 12/1009 |
| 2005/0165758 | A1 | * | 7/2005 | Kasten | G06F 9/5016 |
| 2006/0277390 | A1 | * | 12/2006 | Zuraski, Jr. | G06F 12/1027 711/207 |
| 2011/0208935 | A1 | * | 8/2011 | Grisenthwaite | G06F 12/1009 711/163 |

(Continued)

OTHER PUBLICATIONS

J. Porquet, A. Greiner, C. Schwarz, "NoC-MPU: a Secure Architecture for Flexible Co-hosting on Shared Memory MPSoCs", Proc. Design Automation and Test in Europe, pp. 591-594, Jul. 2011. (Year: 2011).*

(Continued)

*Primary Examiner* — Mano Padmanabhan
*Assistant Examiner* — William E. Baughman
(74) *Attorney, Agent, or Firm* — Nixon & Vanderhye P.C.

(57) ABSTRACT

An apparatus has processing circuitry for processing instructions from multiple threads. A storage structure is shared between the threads and has a number of entries. Indexing circuitry generates a target index value identifying an entry of the storage structure to be accessed in response to a request from the processing circuitry specifying a requested index value corresponding to information to be accessed from the storage structure. The indexing circuitry generates the target index value as a function of the requested index value and a key value selected depending on which of the threads trigger the request. The key value for at least one of the threads is updated from time to time.

15 Claims, 4 Drawing Sheets

(56) References Cited

U.S. PATENT DOCUMENTS

2015/0205885 A1* 7/2015 Zhou ................. G06F 17/30622
707/742
2015/0286639 A1* 10/2015 Bordawekar ..... G06F 17/30949
707/747

OTHER PUBLICATIONS

L. Fiorin, G. Palermo, S. Lukovic, V. Catalano, C. Silvano, "Secure Memory Accesses on Networks-on-Chip", IEEE Trans. Comput., vol. 57, No. 9, pp. 1216-1229, 2008. (Year: 2008).*
U.S. Appl. No. 15/825,524, filed Nov. 29, 2017, Inventor: Grocutt et al.

* cited by examiner

FIG. 6

INDEXING ENTRIES OF A STORAGE STRUCTURE SHARED BETWEEN MULTIPLE THREADS

BACKGROUND

Technical Field

The present technique relates to the field of data processing.

Technical Background

An apparatus may have processing circuitry which supports execution of instructions from two or more different threads and a storage structure shared between the multiple threads. Contention for the same entries of the storage structure between different threads can affect performance.

SUMMARY

At least some examples provide an apparatus comprising:
processing circuitry to process instructions from a plurality of threads;
a storage structure shared between the plurality of threads and comprising a plurality of entries; and
indexing circuitry to generate a target index value identifying an entry of the storage structure to be accessed in response to a request from the processing circuitry specifying a requested index value corresponding to information to be accessed from the storage structure;
wherein the indexing circuitry is configured to generate the target index value as a function of the requested index value and a key value selected depending on which of the plurality of threads triggered the request, and to update the key value selected for at least one of the threads from time to time.

At least some examples provide an apparatus comprising:
means for processing instructions from a plurality of threads;
means for storage shared between the plurality of threads and comprising a plurality of entries; and
means for generating a target index value identifying an entry of the means for storage to be accessed in response to a request from the means for processing specifying a requested index value corresponding to information to be accessed from the means for storage;
wherein the means for generating is configured to generate the target index value as a function of the requested index value and a key value selected depending on which of the plurality of threads triggered the request, and to update the key value selected for at least one of the threads from time to time.

At least some examples provide a data processing method comprising:
processing instructions from a plurality of threads;
issuing a request for information from a storage structure shared between the plurality of threads and comprising a plurality of entries, the request specifying a requested index value corresponding to the information to be accessed; and
generating a target index value identifying an entry of the storage structure to be accessed in response to the request, wherein the target index value is generated as a function of the requested index value and a key value selected depending on which of the plurality of threads triggered the request, and the key value selected for at least one of the threads is updated from time to time.

Further aspects, features and advantages of the present technique will be apparent from the following description of examples, which is to be read in conjunction with the accompanying drawings.

DESCRIPTION OF EXAMPLES

Some specific examples will be described below. It will be appreciated that the invention is not limited to these particular examples.

Two or more threads processed by processing circuitry may share a storage structure having a number of entries. If the same indexing scheme was used for all threads, contention between different threads for an entry at a given index of the storage structure can reduce processing performance, which can also make the system more vulnerable to side-channel attacks because a malicious thread could intentionally trigger requests for certain indices of the storage structure and use any observed loss of performance for a given index to infer that other threads are also accessing the same indices. For security reasons, it may be undesirable to allow one thread visibility of the operation of another thread.

Instead, indexing circuitry can be provided to control indexing into the storage structure. When the processing circuitry requests information from the storage structure, the indexing circuitry may map a requested index value identified by the request to a target index value identifying which entry of the storage structure is to be accessed. The indexing circuitry may generate the target index value as a function of the requested index value and a key value selected depending on which of the threads triggered the request. Also, the indexing circuitry may update the key value selected for at least one of the threads from time to time.

This approach can both help to improve performance and also reduce the likelihood of interference by side-channel attacks. By generating a target index value as a function of the requesting index value and a key value selected based on the requesting thread, different threads effectively use different indexing schemes, so that one thread experiencing a loss of performance for a given requested index value cannot assume that another thread is also trying to access the same requested index value. This makes interference by side-channel attacks more difficult. Also, by changing the key value for at least one of the threads from time to time, this means that even if a particular combination of requests from different threads happens to alias onto the same entry of the storage structure for a time, any loss of performance caused by the contention merely lasts until the next time the key value is changed, at which point the combinations of requested index values from different threads which map to the same target index value will change so that the previously conflicting requests no longer contend for the same entry of the storage structure. By restricting the duration of periods of adverse aliasing in the storage structure, performance as a whole can be improved. Changing the key values from time to time also provides further protection against side-channel attacks.

The function used to generate the target index value may be any hash function which transforms the requested index value based on the key value selected for the thread which triggered the request. The function may provide a one-to-one mapping between the requested index value and the target index value with the key value controlling the way in which this mapping is performed. One example of a suitable hash function may be XOR (exclusive OR) which can be implemented relatively efficiently using XOR gates. Other examples may use other combinations of logic gates, or could use a more arbitrarily defined hash function which could be implemented using a lookup table.

In general, the indexing circuitry may update the key value selected for at least one of the threads from time to time. It is not essential to update the key values for all of the threads, as even if one of the threads uses a fixed key value, changing the key values associated with other threads can still ensure that there is a change to which particular sets of requested index values from different threads map to the same entry of the storage structure. Nevertheless, for increased security, the key values for all threads could be changed from time to time.

In general, the indexing circuitry may update the key value(s) when a certain key updating event occurs. For example, the key updating event may comprise the elapse of a predetermined period since a previous key updating event. The period could be measured in terms of time, a number of elapsed processing cycles or a number of processed instructions. A counter may be provided to track the elapse of the period, and when the period expires, the keys may be changed to remap which requests from different threads will alias to the same entry of the storage structure.

Alternatively, the key updating event could be a context switch. The context switch could be a change of execution context or change between which thread is executed.

Another option may be to provide monitoring circuitry which monitors at least one performance metric indicative of a level of contention between threads for entries of the storage structure, and to trigger a key updating event if the at least one performance metric satisfies at least one condition. For example the metric could be an indication of a number of evictions from the storage structure (or a fraction of accesses which cause evictions). If more evictions occur, this may be a hint that contention between threads could be causing thrashing. Also, the metric could indicate a number of mispredictions based on information accessed from a predictive storage structure such as a branch predictor or data prefetcher. Mispredictions may be more common if there is contention between threads for the same prediction entry, because the prediction data established by one thread may give the wrong prediction for another thread. By triggering a key updating event if the performance metric(s) indicate that contention could be high, this changes which requests from different threads alias onto the same storage entry, which can resolve the observed loss of performance if contention was the cause.

Some systems may use only one type of key updating event, such as the epoch-based approach of updating the keys at periodic intervals, or updating at each context switch. However, other systems may combine multiple types of key updating event. For example, while generally the keys may be updated each time a predetermined period elapses, in addition the performance monitoring circuitry may trigger additional key updates if performance metrics indicate possible contention, even if the predetermined period has not yet expired.

In general, the key values may be arbitrary data values which are changed from time to time. However, in one example each key value may be a random or pseudorandom number, which is updated from time to time. By randomly or pseudorandomly hashing the index values requested by different threads using different random or pseudorandom numbers, this can make it harder to predict the aliasing of indices from different threads, making side-channel attacks more difficult.

In some systems a true random number could be used as a key value, generated with a hardware random number generator which uses physical effects to generate the random number.

However, in many cases a pseudorandom number may provide sufficient security against attacks, and pseudorandom number generators may be more efficient to implement in circuitry. For example, a linear feedback shift register (LFSR) could be used as the pseudorandom number generator. Hence, a number of pseudorandom number generators can be provided each corresponding to one of the threads, and when a request for information from the storage structure is made, the indexing circuitry may hash the requested index value with the pseudorandom number generated by the pseudorandom number generator corresponding to the thread that triggered the request. When a key updating event occurs, then the indexing circuitry may trigger each of the pseudorandom number generators to update its pseudorandom number (e.g. by triggering a transition of a LFSR).

In general, the request for information from the storage structure may be any signal that triggers a lookup of the storage structure. In some cases the request may simply be the requested index value itself, while in other cases the request may also include other parameters for controlling how the request should be serviced.

The requested index value can be any arbitrary value used to identify the information to be obtained from the storage structure. However often the requested index value may depend on a virtual address generated by the processing circuitry, e.g. the virtual address of an instruction being processed or of a data value to be accessed. The requested index value could be the entire virtual address or only a sub-portion of the address. By hashing the requested index with a per-thread time-varying key value as discussed above, it is more difficult for an attacker to derive information about which virtual addresses are being accessed by other threads.

The technique is particularly useful where the storage structure comprises a predictive storage structure for which the entries store information indicating a predicted behaviour of the processing circuitry to be used when processing instructions. Where the storage structure provides a prediction, there is typically a performance penalty if the prediction turns out to be incorrect. For example, some types of predictor (e.g. a branch predictor or branch target address cache) may trigger speculative processing assuming the prediction is correct, and if the prediction later turns out to be incorrect, a recovery operation may be required to flush the processing pipeline and/or restore past state, which would affect performance. Other types of predictor (e.g. a TLB or cache) may not trigger speculative processing, but may simply provide certain resources (e.g. address translation entries or data values) which are predicted to be useful for subsequent instructions, but if it turns out that the subsequent instructions do not actually use this data and need other data to be fetched, there may be a delay in comparison to the case when the prediction was correct.

Either way, contention between threads for the same prediction entry can cause loss of performance, because a prediction made for one thread is unlikely to be correct for another thread and also one thread may pollute another thread's predictions. While one option for preventing such contention would be to provide entirely separate predictors for each thread, this may require more circuitry and in practice not all threads may use the full predictive resources. By sharing the predictor between threads, the circuit overhead may be lower. By using the indexing circuitry discussed above, potential loss of performance caused by different threads contending for the same predictive resources can be restricted to shorter periods, and side-channel attacks exploiting such loss of performance are more difficult.

For example, the storage structure could be any of the following:
 a branch predictor which stores information indicating predicted outcomes of branch instructions;
 a branch target address cache which stores information indicating predicted target addresses of branch instructions;
 a data prefetch storage structure for storing information for predicting addresses from which data values are to be prefetched into a cache;
 a translation lookaside buffer for storing address translation data for translating virtual addresses to physical addresses;
 a store-to-load forwarding storage structure which stores a data value to be stored to a data store in response to a store instruction for access by a subsequent load instruction targeting the same address as the store instruction; or
 a virtually-indexed cache.

It will be appreciated that these are just some examples of the types of storage structure which could use the indexing circuitry discussed above. In a system comprising more than one of these types of storage structure, any one or more of the storage structures can be provided with corresponding indexing circuitry (it is not essential for all of the storage structures to use indexing circuitry of the type discussed above). The key values used in the indexing circuitry of each of the storage structures could be the same for each storage structure, or could be different for different storage structures.

It is not essential for the per-thread hashing of the requested index to be used all the time. In some cases, the indexing circuitry may have a first mode in which the indexing circuitry generates the target index value as a function of the requested index value and the key value selected depending on which of the plurality of threads triggered the request (as discussed above), as well as a second mode in which the target index value is generated from the requested index value independent of which of the plurality of threads triggered the request. For example, the indexing circuitry could have support for overriding the per-thread selection of the key value and using a default key value instead when the second mode is selected. The selection of which mode to use could be based on configuration data which is programmable by the user (setting of the configuration data could be restricted to certain privilege levels such as the operating system or hypervisor privilege level). For example, a user who is not concerned with side-channel attacks may temporarily wish to override the random hashing of the indices.

In some cases, one or other of the first and second modes could be selected globally for all possible values of the requested index value.

However, it is also possible to use the first mode for some ranges of requested index values and the second mode for other ranges. For example, configuration data may specify which ranges of requested indices are to use the second mode (e.g. if the indices are based on virtual addresses, the configuration data may identify certain regions of the address space as not being subject to hashing of the index).

When using the first mode, a first portion of the target index value may be generated as a function of a first portion of the requested index value and the key value, and a second portion of the target index value may be generated using a direct mapping from a second portion of the requested index value. This ensures that the variation in the index value caused by the hashing is restricted to the first portion of the target index value, and so allows certain ranges of requested index values for which the second mode should be used to be identified using the second portion of the requested index value, so that as a whole regardless of whether the first or second mode is being used for a given set of requested index values, there is a one-to-one mapping between requested index values and target index values.

Providing first and second modes, which can be applied to different ranges of requested index values, can be particularly useful where the storage structure is a virtually-indexed cache. For a virtually-indexed cache, it is possible that multiple threads may actually need to access the same data associated with a particular physical address, so that contention for the same entry of the cache would not cause a performance issue. In this case, applying the hashing scheme could lead to multiple entries of the virtually-indexed cache being allocated to different threads for storing data from the same physical address, which can pose challenges in maintaining coherency and may lead to thrashing where one thread keeps triggering invalidation of another thread's entry. This situation can be detected using a further cache which is physically-indexed (e.g. the further cache may be a level 2 cache while the virtually-indexed cache is level 1). If the further cache signals that multiple threads are detected to be accessing data having the same physical address, then configuration data can be set specifying a range of requested index values (including the indices corresponding to that physical address) which should be handled using the second mode.

In general, a thread may be any stream of instruction execution which is independent from other threads. For example, each thread could correspond to a different program being executed, a different context in which programs are executed, or a different instance of the same program being executed with different input data values. There are different approaches for handling multiple threads using the processing circuitry. Some examples may use a coarse-grained multi-threading technique where at any given time the processing circuitry is processing instructions from a single thread, but from time to time there is a context switch to change which thread is currently being executed. In such an example, even though there is only one thread being processed at a given time, while processing one thread, the shared storage structures may still store information established following execution of another thread and this contention could lead to loss of performance, which can be mitigated using the indexing technique discussed above. When there is time-divisional multiplexing of the different threads, it can be particularly useful to change the key values when there is a context switch as discussed above.

On the other hand, some systems may provide a processing pipeline which supports instructions from multiple threads being in-flight in the pipeline concurrently. For example, the processing circuitry may use simultaneous multi-threading (SMT). Each instruction passed down the pipeline may be tagged with a thread identifier identifying which thread it belongs to, and there may be multiple sets of execution resources provided for each thread, e.g. multiple sets of registers, multiple program counters, etc. This approach allows multiple threads to be processed simultaneously as the state associated with each thread can be retained within the processing pipeline. The technique discussed above is particularly useful for such an SMT example because when there are multiple threads in flight concurrently then there is a greater chance of contention for shared storage structures such as a TLB or branch predictor.

Figure 1:
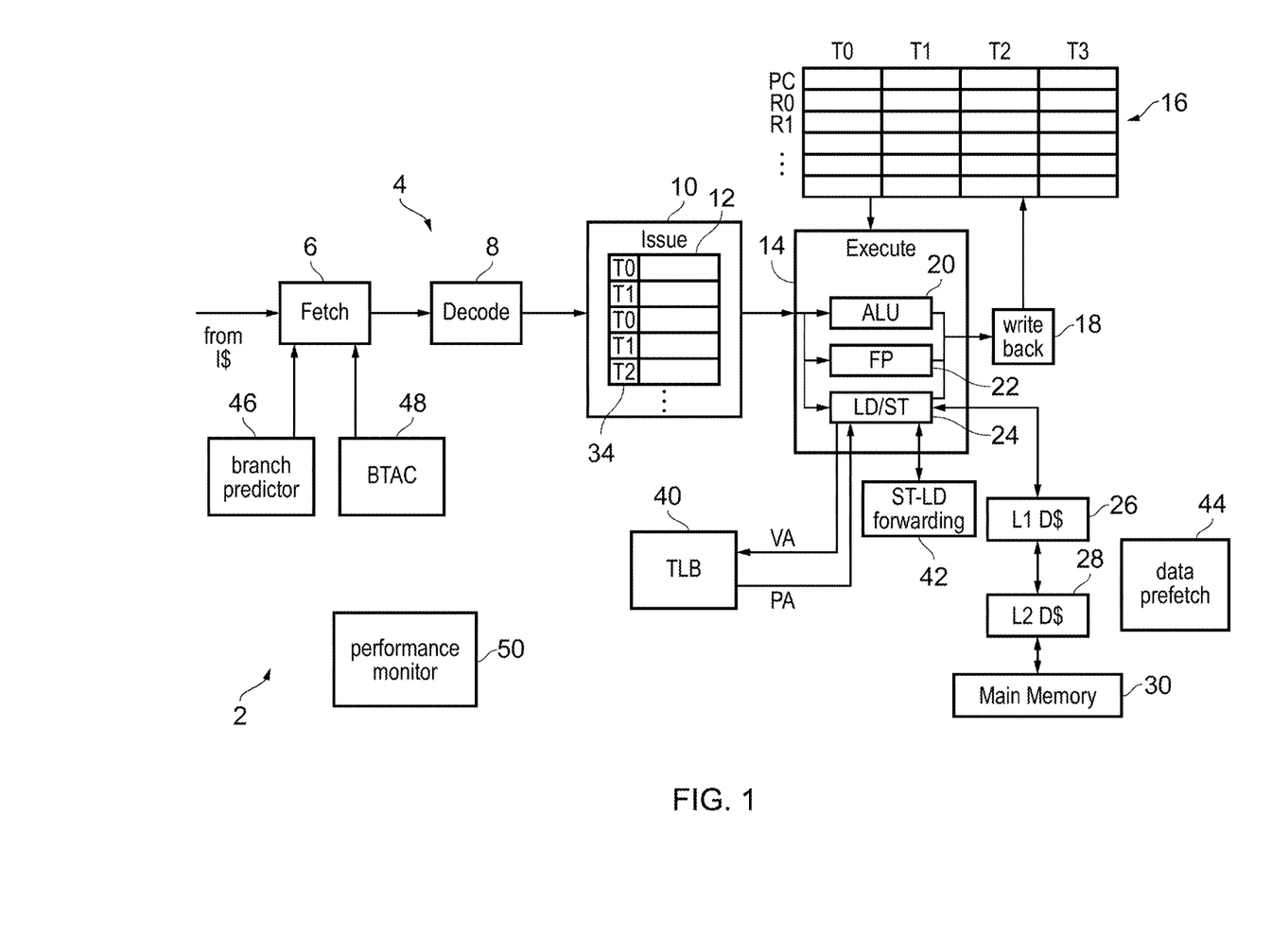
FIG. 1 schematically illustrates an example of a data processing apparatus having processing circuitry for processing instructions from multiple threads and storage structures shared between the threads.

FIG. 1 schematically illustrates an example of a data processing apparatus 2 comprising a processing pipeline 4 for processing instructions from multiple threads of independent execution. The pipeline 4 has a number of pipeline stages including a fetch stage 6 for fetching instructions from an instruction cache or memory; a decode stage 8 for decoding the fetched instructions; an issue stage 10 for queueing instructions in an issue queue 12 while awaiting operands to become available and issuing the instructions for execution when the operands are available; an execute stage 14 for executing the instructions to perform various data processing operations using operands read from registers 16; and a write back stage 18 for writing results of the executed instructions back to the register bank 16. In this example the execute stage 14 includes a number of execution units including an arithmetic/logic unit (ALU) 20 for performing arithmetic operations such as add, subtract, multiply or divide and logical operations such as shifts or bitwise operations such as AND, OR, XOR, etc., a floating point unit 22 for performing floating-point operations, and a load/store unit 24 for carrying out load or store operations to transfer data between the registers 16 and a memory system. In this example the memory system includes level one (L1) and level two (L2) data caches 26, 28 and main memory 30, but it will be appreciated that in other embodiments the memory system may have a different architecture. For example different numbers of levels of cache may be provided in the hierarchy. It will also be appreciated that the particular set of execute units shown in the execute stage 14 of FIG. 1 is just one example and other types of execution unit could also be provided. Similarly, the pipeline could have other stages not shown in FIG. 1. For example, in an out-of-order processor, a rename stage could be provided between the decode and issue stages 8, 10 for remapping architectural register specifiers specified by instructions to identify operands to be used to physical register specifiers identifying physical registers 16 provided in hardware.

In the example of FIG. 1, the processing pipeline 4 supports simultaneous multi-threading (SMT). In an SMT pipeline, the pipeline may have instructions from multiple threads in flight within the pipeline simultaneously. Unlike conventional pipelines which support multiple threads on a coarse-grained basis, with only one particular thread being processed at a given time and periodic interrupts triggering context switches between threads in which register state associated with the old thread is saved to memory so that the same registers can be reused for storing data for a different thread, with an SMT pipeline multi-threading is supported at a more fine-grained level with instructions from several threads resident in the pipeline concurrently. The fetch stage 6 can simply fetch instructions from any of the threads into the pipeline in any order. To distinguish the threads, each instruction passing down the pipeline may have a corresponding thread identifier which identifies which thread the instruction belongs to. For example, in FIG. 1 the issue queue 12 is illustrated with each entry of the queue having a corresponding thread identifier 34 to indicate the corresponding thread for that instruction. Similarly other parts of the pipeline may also tag instructions with their corresponding thread identifier. Multiple sets of registers 16 are provided with each register set corresponding to a particular thread. Not only the general purpose architectural state registers R0, R1 etc., but also special purpose registers such as a program counter or exception return register, may be banked per thread so that each thread has hardware registers provided for storing a complete set of architectural register state for that thread. Hence, when executing a given instruction, the pipeline can determine which register set to use based on the thread identifier. FIG. 1 shows an example where hardware register sets are provided for four distinct threads T0, T1, T2, T3 but it will be appreciated that other examples may scale up or down the number of register sets to more or fewer threads. Note that even in an SMT system, there may still be some context switches since the total number of threads to be executed may be greater than the number of threads for which concurrent execution is supported in hardware, and so a context switch may sometimes be performed to change which thread is referred to by a given thread identifier in the pipeline. However, by providing multiple sets of registers for handing the architectural state associated with each thread, context switches involving state saving/restoration are less frequent, to help improve performance.

As shown in FIG. 1, the apparatus 2 may include a number of storage structures for storing information for controlling various aspects of the processing of instructions by the pipeline 4. For example these storage structures may include a translation look aside buffer (TLB) 40, store-to-load forwarding storage 42, a data prefetcher 44, a branch predictor 46 and a branch target address cache (BTAC). It will be appreciated that it is not essential for a given apparatus to be provided with all of these types of storage structures and some examples may only have some of them.

The TLB 40 is used for translating virtual addresses identified by the pipeline 4 in response to program instructions into physical addresses identifying data to be accessed in the memory system. In response to a load or store instruction, the load/store unit 24 calculates the virtual address to be accessed (e.g. by adding an offset to a base address, for example, depending on the addressing scheme being used) and issues a translation request to the TLB 40 specifying the virtual address and optionally some additional parameters such as whether the operation being performed is a read or write operation, and a parameter identifying the context, process or privilege level from which the data access was initiated. The TLB 40 has a number of entries for storing translation data for mapping the virtual address to corresponding physical address. Each entry corresponds to a block of virtual addresses of a given size, known as a "page". Hence, when a translation request is received, the TLB 40 checks whether one of its entries corresponds to a page including the virtual address specified by the translation request, and if so, determines that there is a TLB hit. If there is no matching entry for the requested virtual address, then there is a TLB miss.

As different threads may have different address translation schemes, for a system supporting SMT, each entry may also be tagged with a thread identifier of the corresponding thread. In this case, the translation request may specify the thread identifier of the thread requesting the translation, and there is a TLB hit when one of the entries of the TLB corresponds to the same thread identifier and virtual address as specified by the translation request. If the virtual address matches against an entry, but it has a different thread identifier, then a TLB miss is identified.

When a TLB hit is identified, the TLB checks whether the additional parameters provided with the address translation request satisfy any access permissions defined in the matching TLB entry, such as whether access to a particular region of memory is permitted by a given process or context and whether read/write access or read only access is defined for that region. If the access is permitted, the physical address is returned to the load/store unit 24, which initiates a data access to the memory system using the physical address. On the other hand, if the access is not permitted, a memory fault may be triggered. On the other hand, if a TLB miss is identified, the TLB triggers an access to the memory system to fetch the required address translation data from page tables stored in the memory, and this can delay servicing of the load or store instruction.

While FIG. 1 shows a single TLB 40, in practice there may be multiple levels of TLB in a similar way to the L1 and L2 data cache 26, 28, with a level one TLB providing faster access to a relatively small subset of page table entries while a level two or further level TLB can store a greater number of entries but is slower to access. In this case, if there is a miss in the L1 TLB, the L2 TLB is looked up to see if it has a matching entry, and if so the required entry is fetched into the L1 TLB for faster access next time. If the request misses in all levels of TLB, then a request for the required page table entry may be issued to the memory system.

In summary, the TLB has a number of entries indexed by a portion of the virtual address of a data value to be accessed, which each store data for translating the virtual address into a corresponding physical address. The particular way in which the index is used to identify the corresponding TLB entry may vary from implementation to implementation. For example, some TLBs may use a direct-mapped or set-associative cache structure where the translation data for a given address can only be stored at one of a limited set of one or more entries of the TLB, and cannot be stored at other entries outside this set. In this case, the index may be used to identify the corresponding set. In other examples, the TLB may have a fully-associative cache structure or function as a content-addressable memory, so that the translation data for translating a given address can be stored in any of the TLB entries, and the TLB is searched by comparing the index against part of the information stored in each entry to identify whether the entry matches the index.

The store-to-load forwarding structure 42 helps support memory disambiguation techniques which aim to reduce the number of accesses to the memory system. When a store instruction is executed to write a data value from one of the registers 16 to the memory system 26, 28, 30, the data value is also written to the store-to-load forwarding structure 42 and tagged with at least part of its virtual address. When executing a load instruction for loading a data value from the memory system 26, 28, 30 to a register 16, the store-to-load forwarding structure 42 is looked up to identify whether it stores a value corresponding to the target virtual address of the load instruction. If so, then the corresponding data value can be read faster from the store-to-load forwarding circuitry 42 than from the L1 data cache 26 or other parts of the memory system. It can be relatively common for a store instruction to be followed relatively soon after a load to the same address, because if there is insufficient space in the register file 16 for storing a block of values being processed by a given sequence of code, then there may be a need to temporarily push data values out to the memory system, and so by providing the store-to-load forwarding structure 42 for retaining locally a given number of recently stored values, this can improve performance by reducing the latency of handling the loads. Hence, store-to-load forwarding structure 42 provides a number of entries indexed by the virtual address of a load instruction, which store data values previously written to the memory system by a store instruction. As for the TLB, in an SMT system the entries of the store-to-load forwarding structure 42 may be tagged by the thread identifier of the associated thread to avoid matching against entries established by other threads.

The data prefetch storage 44 is used for predicting which data values are likely to be needed in the cache 26, 28 ahead of the time when the instructions processed by the pipeline actually request that data. Based on observation of past instructions, the data prefetch circuitry 44 may build up entries indicating that when a certain program counter address is encountered, data associated with a given physical address should be loaded into one of the caches 26, 28 to speed up access if a load instruction subsequently requests that data. If such a load instruction is subsequently encountered then the data prefetcher may increase the confidence of its prediction to make it more likely that it will be made again in future. If no load instruction targeting the prefetched data is encountered within a given time frame then the confidence in the prediction may be reduced and eventually if a prediction keeps being incorrect then the data prefetcher 44 may adapt its prediction policy to stop prefetching that data and prefetch other data which is more likely to be used. Hence, the prefetcher 44 may have a number of entries indexed by the virtual address of a program instruction to be executed, with each entries identifying corresponding physical addresses of data to be prefetched into a given level of cache 26, 28.

The branch predictor 46 and BTAC 48 are used by the fetch stage 6 for predicting the outcomes of branch instructions. The branch predictor 46 has a number of entries indexed by the virtual address of an instruction (determined based on the program counter), which track whether branches at certain instruction addresses are likely to be taken or not taken. The BTAC 48 is also indexed by the program counter virtual address, but caches the target addresses of branch instructions. Hence, when a branch is encountered by the fetch stage 6, the fetch stage 6 looks up the branch instruction's address in the branch predictor 46, and if there is a hit, predicts the branch as taken or not taken based on an indication provided by the branch predictor 46. If the branch is predicted taken, the fetch stage 6 begins fetching subsequent instructions from the predicted branch target address indicated by the BTAC 48 for that branch. If the branch is predicted not taken, the fetch stage 6 continues to fetch instructions from addresses following on sequentially from the branch instruction's address. The actual branch outcome, and the branch target address if the branch is taken, may depend on the outcomes of earlier instructions which are still pending in the pipeline, and so may not be determined until some time after the prediction was made. If the prediction was correct, then starting to fetch and decode subsequent instructions without waiting for the branch to be resolved helps to improve performance. If there is a misprediction, the pipeline is flushed and fetching and decoding of instructions resumes from the instruction which should have been fetched following the branch. When there is a misprediction, the branch predictor 46 and BTAC 48 are updated to reduce the chance of the same prediction being made again (e.g. the branch outcome or target address can be updated to reflect the actual result). A confidence counter can be used so that several mispredictions are required before a previous good prediction is overwritten, to avoid an occasional misprediction changing the prediction made when most times the prediction is correct.

Hence, there may be a number of storage structures in a system which may be shared between multiple threads being processed by the pipeline. In general, each of these storage structures may be indexed based on an index value which is dependent on the virtual address. In the case of the TLB 40 or the store to load forwarding structure 42, this may be a virtual address of data to be accessed from the memory system. For the data prefetcher 44, branch predictor 46 and BTAC 48, the indexed virtual address may be an instruction address (e.g. the current program counter value at the point of triggering the prefetch or branch prediction). In some systems, the L1 cache 26 may also be virtually indexed.

As multiple threads sharing these storage structures may use the same virtual addresses to refer to entirely different instructions or data, sharing such storage structures can lead to interference. This can cause two issues. Firstly, one thread may establish a prediction for a given virtual address, but another thread accessing the same virtual address may read the prediction set up by the first thread and this prediction may be wrong for the second thread because it relates to a different physical address. If the second thread then updates the prediction based on its outcome, this may then lead to a wrong prediction for the first thread. Hence, contention for fixed predictive resources may lead to performance degradation over all the execution contexts.

Another issue may be that the performance degradation caused by contention for the same predictive storage entries may be exploited by a malicious attacker to attempt to gain side-channel information about another thread's execution. Typically, it may be desirable to prevent one thread gaining information about data or program instructions used by another thread as some of the threads may be sensitive or may process secure data. The apparatus may be provided with performance monitoring circuitry 50 for tracking the performance of the processor when executing instructions. The performance monitoring circuitry 50 may monitor various performance metrics including latencies associated with certain instructions or activity, or logging the number of events of a given type which have occurred for a given thread, such as a number of TLB misses 40, number of branch mispredictions etc. Even if the actual instructions or data being processed by a different thread are not visible to a the attacker's thread, the performance achieved by the attacker's thread may be visible and this could provide some insight into activity of other threads. For example, the attacker could write their thread so that it repeatedly triggers a series of requests to one of the storage structures 40 to 48 for a given address or set of addresses, and if it is observed that requesting a particular set of addresses causes loss of performance then it may be inferred that one of the other threads is also currently accessing similar entries of the storage structure. If the same indexing scheme is used for all the threads to select which entries of the storage structures to access for a given virtual address, then this may effectively give the attacker's thread visibility of which virtual addresses of instructions or data are being used by another thread. Even if this does not provide a definite indication of which particular addresses are being accessed by which thread, this type of side-channel information can provide enough information to constrain which possible addresses could be being accessed, which can limit the number of options to try in a brute force attack, making the system more vulnerable.

In summary, in addition to poor performance caused by different threads executing instructions with the same virtual addresses that require different predictive data or address translation data in the storage structures, using the same indexing scheme for all of the threads can also open up the chance for side-channel attacks where one thread can intentionally cause contention for the storage resources and derive information about another thread's execution from performance based metrics tracked by the performance monitor 50.

This problem can be addressed by providing any of the storage structures 26, 40, 42, 44, 46, 48 with indexing circuitry which applies different indexing schemes for each thread and also varies the indexing schemes over time so that the sets of virtual addresses from each of the threads which map to the same entry of the storage structure changes over time. By changing the indexing scheme periodically, although pathological performance cases where threads temporarily contend for some storage entries may occur for some time, on the whole performance would not suffer from short durations of bad aliasing within the storage structures since the mapping would then be changed to avoid the performance loss. Also, this can make it very hard to predict what may be causing interference and contention for a given storage resource.

Figure 2:
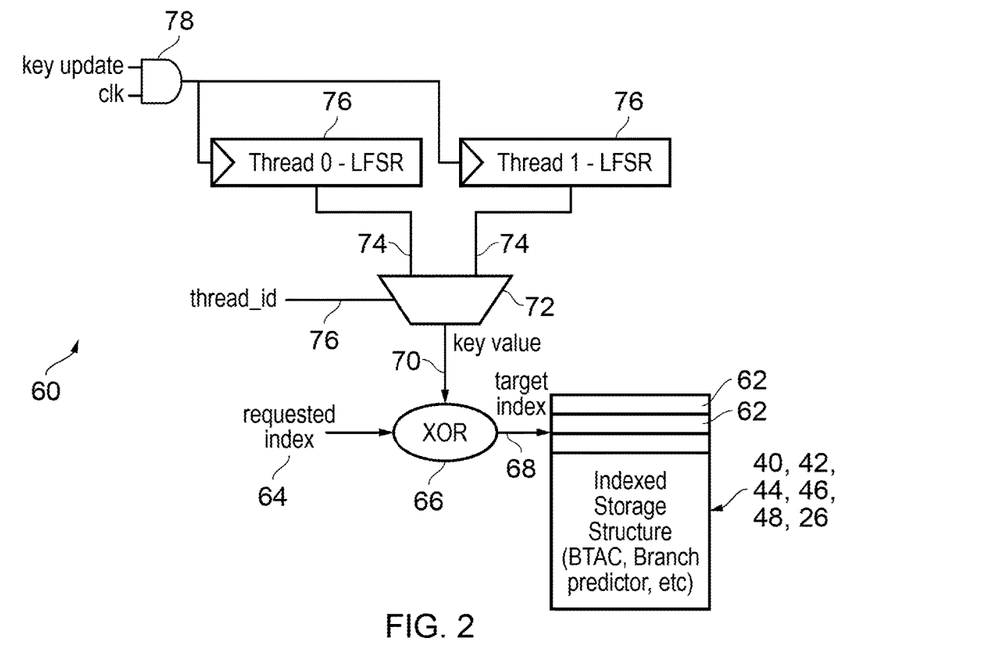
FIG. 2 shows an example of indexing circuitry for generating a target index value identifying an entry of a storage structure to be accessed.

FIG. 2 shows an example of indexing circuitry 60 which may be included in any of the storage structures 26, 40, 42, 44, 46, 48 for controlling which entry is accessed in response to a request for information from the pipeline 4. The storage structure has a number of entries 62 each identified by a target index value which is used to select the corresponding entry. The indexing circuitry receives a requested index value 64 from the processing pipeline, which could be a virtual address or a part of a virtual address for example. Hashing circuitry 66 maps the requested index 64 to the target index 68 by hashing the requested index 64 with a key value 70 which is selected by a multiplexer 72. The multiplexer 72 selects between a number of thread key values 74 depending on a thread identifier 76 of the thread which triggered the current request to the storage structure. Each thread's key value is generated by a corresponding pseudorandom number generator 76, which in this example is a linear feedback shift register (LFSR). In this example the indexing circuitry is shown with two pseudorandom number generators for generating respective key values for two threads 0 and 1, but other examples may support more than two threads.

Key updating circuitry 78 is also provided for triggering each pseudorandom number generator 76 to change its pseudorandom number in response to a key updating event. For example the key updating event could be a context switch between execution contexts or threads, the expiry of a certain period of time or a certain number of instructions encountered since the previous key update, or could be based on performance metrics captured by the performance monitor 50 indicating a level of contention for the storage structure that is greater than the certain amount. While FIG. 2 shows an example where all of the pseudorandom number generators are updated in response to the key update event, other examples may only update some of them. For example, by updating the keys associated with all but one of the threads, this may be enough to adjust the mapping of which requested indices from different threads map to the same entry of the storage structure. FIG. 2 shows an example where the hash function used by the hashing circuitry 66 is XOR, but any other hash function could be used which provides a one to one mapping between the requested index value and the target index value, with the mapping varying based on the selected key value 70.

In summary, by hashing the index for the storage structure with a per-thread pseudorandom number which changes periodically, this reduces the chance of predictive interference in side channel attacks and although pathological performance cases may occur for a short time, the keys will then be updated and previously contending requests are now mapped to different entries of the storage structure. Hence, on the whole performance is improved since durations of bad aliasing into storage structure can be restricted in time to the period between successive key updates.

If multiple storage structures within the apparatus provided with indexing circuitry supporting the pseudorandom hashing as shown in FIG. 2, then while the multiplexer 72 and hashing circuit 66 may be provided separately for each storage structure, the pseudorandom number generators 76 generating the keys for each thread may be shared between the two or more storage structures to reduce the circuit overhead. Hence, the key values 74 for a given thread could be the same across multiple storage structures, but changed periodically when a key updating event occurs.

The interval with which the keys are updated may be selected on an implementation basis depending on the requirements of a given system. However, since updating the keys means the predictive data previously established for a given address will no longer be indexed by that address, it may be desirable for the key updates to be relatively infrequent to reduce the cost in retraining the prediction mechanisms.

While the examples above generally use the virtual address or a part of the virtual address as the requested index 64, the technique could also be applied to storage structures which use other types of index.

For some storage structures such as the TLB 40, a miss may trigger a request for the required information to be fetched from the memory system. In this case, the request to the memory system may specify the originally requested, unhashed, index, not the target index generated by hashing.

Figure 3:
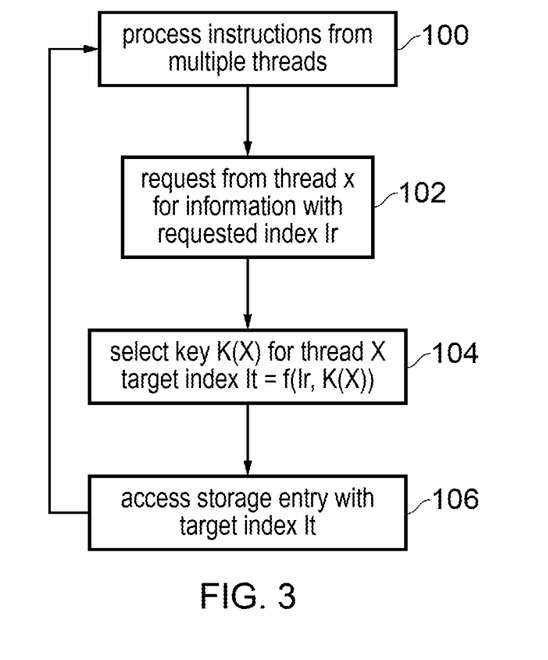
FIG. 3 is a flow diagram illustrating a method of processing instructions from multiple threads.

FIG. 3 shows a method of accessing information from one of the storage structures described above. At step 100, the pipeline processes instructions from multiple threads. At step 102 one of the instructions associated with a given thread X triggers a request to one of the storage structures for information identified by a requested index Ir. For example, the request could be a request for a branch prediction, an address translation request, etc. At step 104, the indexing circuitry 60 selects a key value K(X) which corresponds to thread X, from among several candidate keys each corresponding to one of the threads. For example each of the candidate keys may be pseudorandom numbers as discussed above. Alternatively they could be true random numbers or any other kind of arbitrary key value associated with thread X. The indexing circuitry 60 generates a target index value It as a function of the requested index Ir and the selected key value K(X). For example the function could be XOR or any other one-to-one mapping hash function such as a substitution box, an arbitrary look up table or other function. At step 106 the indexing circuitry triggers an access to the required entry of the storage structure using the target index value It, and returns the corresponding information which can then be used to control the operation of the pipeline, such as providing a prediction, translating an address or providing a required data value. The method then returns to step 100 to continue processing.

Figure 4:
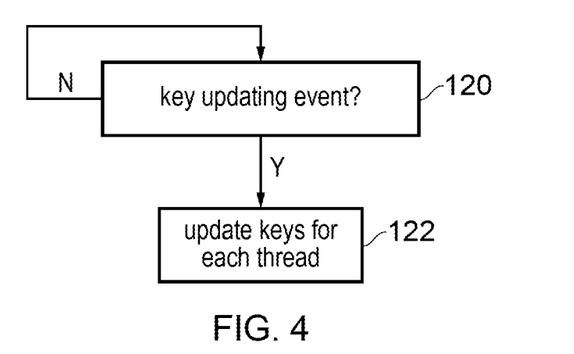
FIG. 4 is a flow diagram showing a method of updating keys for generating the target index value.

FIG. 4 shows a method of updating the keys. At step 120 the indexing circuitry determines whether there has been a key updating event. If not then the keys remain the same. A key updating event could be a context switch, expiry of a countdown timer or a counter indicating that a certain period has elapsed since the last key updating event, or an indication that performance is particularly low at the moment due to contention for the storage structure. When a key updating event occurs, then at step 122 the indexing circuitry triggers an update of the keys for each thread, such as by triggering a transition of the LFSR to transition the keys to the next pseudorandom number in the sequence for each thread.

If the L1 cache 26 is physically addressed then there may be no need for indexing circuitry as shown in FIG. 2 in the L1 cache 26, since even if different threads access the same virtual addresses, the TLB translates these to different physical addresses and so the requests issued to the L1 cache 26 will target different entries. However, if a virtually indexed L1 cache 26 is used, then this could also be provided with indexing circuitry of the type discussed above. With a virtually indexed cache, different threads executing instructions specifying the same virtual address may contend for a limited set of one or more locations in the cache and if there was a high level of contention for a given set then this may trigger evictions when different threads require different physical addresses of data to be loaded into the virtually indexed set of cache locations. The indexing circuitry above can reduce the likelihood that such contention will continue for a long time because periodically changing the hash function's key value will periodically change which patterns of virtual addresses map to the same set for different threads.

Figure 5:
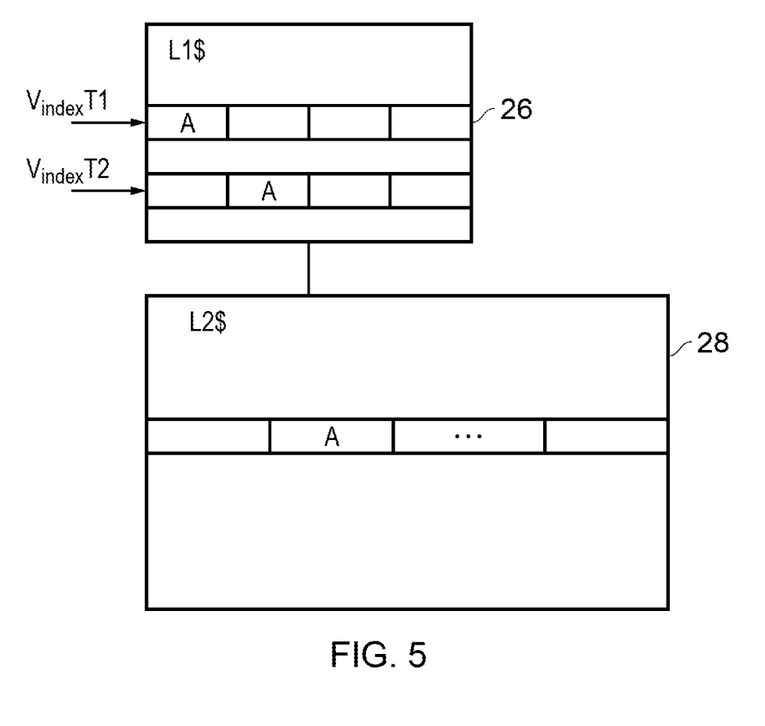
FIG. 5 shows an example of using a physically-indexed level 2 cache to identify when two threads have been allocated different entries of a virtually-indexed level 1 cache for storing data corresponding to the same physical address.

As shown in FIG. 5, when the per-thread hashed indexing scheme described above is used for a virtually-indexed cache 26, it is possible that two different entries of the L1 cache 26 may be allocated for storing a data value A having the same physical address. Even if two threads specify the same virtual address and the TLB 40 applies the same virtual-to-physical address mapping for that address for both threads, the use of different key values for each thread may lead to the corresponding data being placed at different entries in the L1 cache 26. If the threads repeatedly need to access the same shared data, then this can lead to some thrashing where one thread's access to the data leads to the other thread's entry being invalidated from the cache to maintain coherency, causing some reduction in performance. In some systems this may not be considered a problem—with a virtually-indexed cache this issue would also arise if different threads use different virtual addresses to refer to the same physical address, regardless of whether the per-thread hashing scheme is used. However, it can be common for some parts of the virtual address space to be mapped to physical address in the same way for all threads.

Figure 6:
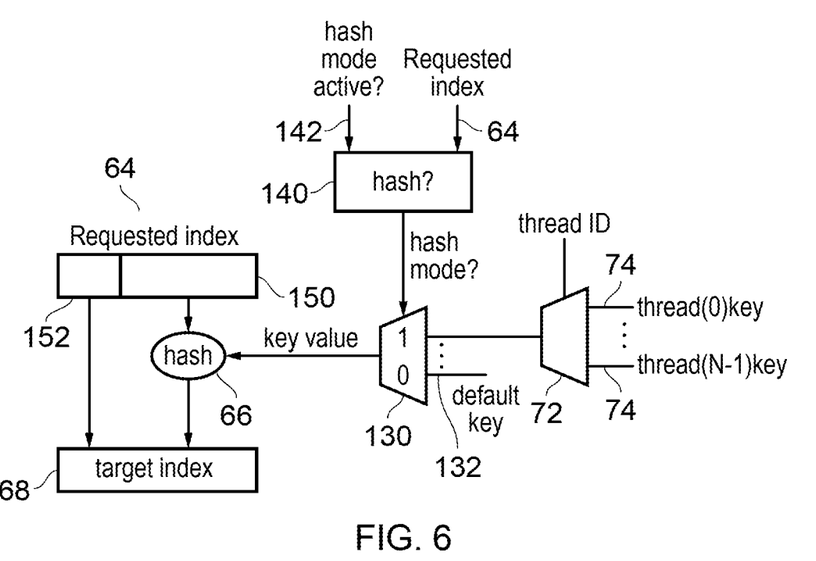
FIG. 6 shows a second example of indexing circuitry having a mode in which the index hashing can be disabled for at least some ranges of index values.

FIG. 6 shows a second example of the indexing circuitry 60 which can be used to selectively disable the per-thread hashing scheme discussed above. The indexing circuitry 60 has a first mode in which the target index value is generated as a function of the requested index value and the key value selected for the requesting thread, and a second mode in which the target index value depends on the requested index value but is independent of which of the threads triggered the request. Which mode is used can be selected globally for all requests, or for selected requests based on the requested index value itself, e.g. with some portions of the virtual address space using the first mode and other portions using the second mode.

As shown in FIG. 6, in addition to the multiplexer 72 selecting between the keys 74 associated with each thread based on the thread identifier of the requesting thread, a further multiplexer 130 is provided to select the key used by hashing circuitry 66. When the first mode is used, the multiplexer 130 selects the key selected by multiplexer 72, which varies depending on the requested thread. When the second mode is used, the multiplexer 130 selects a default key 132 which can be any arbitrary fixed value which does not change depending on the thread (e.g. it could be a default pattern of 0s and 1s). Hence, when the default key is used, the requested index is mapped to the target index in the same way for all threads.

Mode control circuitry 140 is provided to select whether the first or second mode is used. In some cases, the mode control circuitry 140 may receive an input 142 specifying, globally for all requests, whether to use the first or the second mode. The input 142 may be based on configuration data set by software at a given privilege level (e.g. an operating system or hypervisor), so that the software can select the second mode to turn off the pseudorandom hashing completely if desired. For example, if the system is not processing any secure data or code considered vulnerable to attack, the per-thread hashing may be deemed unnecessary, and so it could be disabled to reduce dynamic power in toggling the key values. The pseudorandom number generators 76 could be placed in a power saving state when the second mode is selected.

On the other hand, as mentioned above selection of the first/second mode can be based on the requested index itself (e.g. virtual address), so that some parts of the address space use the first mode and others use the second mode. To ensure that there is a one-to-one mapping between the requested index 64 and the target index 68 even if only some parts of the address space use the first mode, the requested index 64 may be divided into a first portion 150 and a second portion 152. The hash function 66 may be applied only to the first portion 150 to generate a corresponding portion of the target index 68, with the second portion 152 being mapped directly to a corresponding portion of the target index 68. Hence, the use of the random hashing scheme could be restricted to certain regions of the virtual address space storing secure data or code.

In the situation shown in FIG. 5, when the physically-addressed L2 cache 28 detects that multiple threads are accessing data for the same physical address, this may trigger the second mode to be used for a range of virtual addresses corresponding to that physical address. Hence, the L2 cache 28 can determine when 2 threads are cooperatively sharing cache lines in the L1 and disable the hashing in order to eliminate L1 thrashing over truly shared data. Some metadata in the L2 cache 28 can track the number of invalidations from the L1 cache 26 for a given physical address. If the L2 cache 28 determines that Thread 1 is frequently accessing the L2 cache 28 for a given cache line A, only for the L2 cache 28 to have to invalidate the copy Thread 2 has in the L1 cache 26 (the L2 cache 28 may track this based on a back-pointer to where the data is stored in the L1 cache 26), the L2 cache 28 can send a signal to the L1 cache 26 indicating that the L1 should disable the address hashing for a given region of memory (which could be a predetermined "shared" region of implementation dependent size, or one of a limited number of "remembered" regions for which the address hashing should be disabled). This way, the two threads can cooperatively share data in the L1 cache 26.

While FIG. 1 shows an example of a pipeline supporting SMT, the indexing technique discussed above could also be used for systems which support multiple threads through coarse-grained multithreading in which only one thread is executed at a time and a context switch, including saving of a current thread's register state to memory and restoring another thread's state to the registers, is required each time there is a change of thread. However, the technique is particularly useful with SMT because when multiple threads are in flight simultaneously, this increases the risk of contention.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to process instructions from a plurality of threads;
a storage structure shared between the plurality of threads and comprising a plurality of entries; and
indexing circuitry to generate a target index value identifying an entry of the storage structure to be accessed in response to a request from the processing circuitry specifying a requested index value corresponding to information to be accessed from the storage structure;
wherein the indexing circuitry is configured to generate the target index value as a function of the requested index value and a key value selected depending on which of the plurality of threads triggered the request, and to update the key value selected for at least one of the threads in response to a key updating event;
wherein the key value comprises a random or pseudorandom number.

2. The apparatus according to claim 1, wherein the key updating event comprises elapse of a predetermined period since a previous key updating event.

3. The apparatus according to claim 1, wherein the key updating event comprises a context switch.

4. The apparatus according to claim 1, comprising monitoring circuitry configured to monitor at least one performance metric indicative of a level of contention between threads for entries of the storage structure; and the key updating event comprises said at least one performance metric satisfying at least one predetermined condition.

5. The apparatus according to claim 1, comprising a plurality of pseudorandom number generators each corresponding to one of the plurality of threads;
wherein the indexing circuitry is configured to select, as the key value to be used for generating the target index value, a pseudorandom number generated by the pseudorandom number generator corresponding to the thread that triggered the request.

6. The apparatus according to claim 5, wherein in response to a key updating event, the indexing circuitry is configured to control each of the plurality of pseudorandom number generators to update its pseudorandom number.

7. The apparatus according to claim 1, wherein the requested index value is dependent on a virtual address.

8. The apparatus according to claim 1, wherein the storage structure comprises a predictive storage structure for which the plurality of entries are configured to store information indicating a predicted behaviour of the processing circuitry to be used when processing instructions.

9. The apparatus according to claim 1, wherein the storage structure comprises at least one of:
branch prediction storage to store information indicative of predicted outcomes of branch instructions;
a branch target address cache to store information indicative of predicted target addresses of branch instructions;
a data prefetch storage structure to store information for predicting addresses from which data values are to be prefetched into a cache;
a translation lookaside buffer to store address translation information for translating virtual addresses to physical addresses;
a store-to-load forwarding storage structure configured to store a data value to be stored to a data store in response to a store instruction for access by a subsequent load instruction targeting the same address as the store instruction; and
a virtually-indexed cache.

10. The apparatus according to claim 1, wherein the processing circuitry comprises a processing pipeline to process instructions from the plurality of threads with instructions from multiple threads in flight in the processing pipeline concurrently.

11. An apparatus comprising:
processing circuitry to process instructions from a plurality of threads;
a storage structure shared between the plurality of threads and comprising a plurality of entries; and
indexing circuitry to generate a target index value identifying an entry of the storage structure to be accessed in response to a request from the processing circuitry specifying a requested index value corresponding to information to be accessed from the storage structure;
wherein the indexing circuitry is configured to generate the target index value as a function of the requested index value and a key value selected depending on which of the plurality of threads triggered the request, and to update the key value selected for at least one of the threads in response to a key updating event;
in a first mode, the indexing circuitry is configured to generate the target index value as a function of the requested index value and the key value selected depending on which of the plurality of threads triggered the request; and
in a second mode, the indexing circuitry is configured to generate the target index value from the requested index value independent of which of the plurality of threads triggered the request.

12. The apparatus according to claim 11, wherein the indexing circuitry is configured to select whether to use the first mode or the second mode in dependence on the requested index value.

13. The apparatus according to claim 11, wherein in the first mode, the indexing circuitry is configured to generate a first portion of the target index value as a function of a first portion of the requested index value and the key value, and to generate a second portion of the target index value using a direct mapping from a second portion of the requested index value.

14. The apparatus according to claim 11, wherein the storage structure comprises a virtually-indexed cache, and the requested index value depends on a virtual address;
the apparatus comprises a further physically-indexed cache; and
the indexing circuitry is configured to select the second mode for a selected range of requested index values in response to a signal from the further physically-indexed cache indicating that multiple threads are detected to be accessing data for the same physical address.

15. A data processing method comprising:
processing instructions from a plurality of threads;
issuing a request for information from a storage structure shared between the plurality of threads and comprising a plurality of entries, the request specifying a requested index value corresponding to the information to be accessed; and
generating a target index value identifying an entry of the storage structure to be accessed in response to the request, wherein the target index value is generated as a function of the requested index value and a key value selected depending on which of the plurality of threads triggered the request, and the key value selected for at least one of the threads is updated in response to a key updating event;
wherein the key value comprises a random or pseudorandom number.

* * * * *